United States Patent [19]

Fachbach et al.

[11] 4,114,714
[45] Sep. 19, 1978

[54] MOTOR VEHICLE HAVING SOUND-SUPPRESSING ENGINE ENCLOSURE

[75] Inventors: Heinz Fachbach; Gerhard Thien; Josef Greier, all of Graz, Austria

[73] Assignee: Hans List, Graz, Austria

[21] Appl. No.: 693,517

[22] Filed: Jun. 7, 1976

[30] Foreign Application Priority Data

Jun. 13, 1975 [AT] Austria .................................. 4553/75

[51] Int. Cl.² ........................ B60P 4/09; G10K 4/00
[52] U.S. Cl. ............................... 180/54 A; 180/68 R; 180/69 R; 181/204
[58] Field of Search ............... 181/33 K, 204, 200, 181/211; 180/54 A, 69 R, 69 C, 68 R, 68 P, 89.1, 89.19, 89.18, 89.17, 89.12, 89.13, 89.14, 89.15, 89.16, 89.11

[56] References Cited

U.S. PATENT DOCUMENTS

| | | | |
|---|---|---|---|
| 1,723,813 | 8/1929 | Schneider | 180/69 R |
| 1,882,319 | 10/1932 | Gurney | 180/54 A |
| 3,693,602 | 9/1972 | Thien et al. | 181/33 K X |
| 3,845,839 | 11/1974 | Eriksson | 181/33 K |
| 3,882,951 | 5/1975 | Conley | 180/54 A |
| 3,923,114 | 12/1975 | Suzuki | 180/54 A |

FOREIGN PATENT DOCUMENTS

| | | | |
|---|---|---|---|
| 1,034,340 | 7/1953 | France | 180/54 A |
| 884,792 | 12/1961 | United Kingdom | 180/54 A |

*Primary Examiner*—Joseph F. Peters, Jr.
*Assistant Examiner*—Milton L. Smith
*Attorney, Agent, or Firm*—Watson, Cole, Grindle & Watson

[57] ABSTRACT

A motor vehicle with a soundproof encapsulated engine-gearbox unit, wherein the two subframe beams of the vehicle and/or further parts of the vehicle frame and the vehicle body form supplementary integral members of an allround fully closed soundproof encapsulation of the engine-gearbox unit.

7 Claims, 4 Drawing Figures

MOTOR VEHICLE HAVING SOUND-SUPPRESSING ENGINE ENCLOSURE

BACKGROUND OF THE INVENTION

1. Field of the Invention

This invention relates to a motor vehicle having an engine or an engine-gearbox unit encased within a noise-suppressing encapsulation.

2. Description of the Prior Art

The chief sources of noise emission in motor vehicles, such as lorries (e.g. trucks) and motor cars, are the exhaust system, the cooling air fan, the surface of the engine-gearbox unit, and, potentially, also the intake or aspiration system, the vehicle body and the tires. Since the exhaust system, the cooling air fan and the engine-gearbox unit contribute more or less in equal measures to the generation of noise, it is vital that any provisions which aim at a significant reduction of overall noise should cover all three of these main noise-generating sources. The expression "significant reduction of overall noise" is understood to imply a reduction of noise level of the order of 10 decibels (A) and over, which is desirable also in view of future legislation in this field.

Over the years various attempts have been made at reducing exhaust noise as well as for reducing the noise created by cooling air fans, normally involving the use of a rotor having aerodynamically correct design, and additionally to this, the provision of small rotor clearances and low pressure values.

It is also common practice to reduce noise radiation or emanation to the required degree from the engine and gearbox surfaces by providing a noise-suppressing overall casing, or cladding for these two units. In recent years a new construction system has been widely adopted for the design of sound-suppressing engine casings, wherein the engine and the gear box are closely encapsulated on all sides thereof by the sound-suppressing casing or cladding. This type of casing or cladding is distinguished by its comparatively slight additional weight and volume as compared with the open, i.e., unclad, unit. In these conventional arrangements the cladding, or casing, is supported from the engine-gearbox unit by means of body-resonance-absorbing elements. Such claddings are very acoustically effective even without further interior lining of sound-insulating materials, and as a rule they are ventilated by a separate fan unit associated therewith to avoid undue buildup of heat. Readily detachable access covers are normally provided in the maintenance or service areas for engine and gear box.

In spite of all the advantages presented by these conventional casings which are carried on the engine itself, certain problems arise in the special case of an engine-gearbox unit at certain points such as, for example, in the region between the engine and the vehicle frame or chassis and in the region of the engine bearings on the flywheel side, with respect to the accomodation and sealing of the sound-absorbing cladding. Further problems arise in the fitting or dismantling of sound-suppressed engines of this type in motor vehicles for major maintenance or service operations on the engine or gearbox, since the cladding cannot be fully dismantled on the vehicle, or only with great difficulty, i.e., without removing the driving unit as a whole.

These drawbacks are obviated in a further conventional arrangement which is described in SAE Paper 730,682, wherein the sound-suppressing casing, or cladding, is not supported from the engine but combined with the vehicle, the radiator-fan unit being arranged, as usual, in the vicinity of the engine. That is to say, in such cases within the sound-suppressing casing which comprises very large openings both at its front and rear ends to allow the full amount of cooling air required by the water-radiator to pass therethrough. In consequence of this, the acoustic result which can be achieved in this manner is disappointingly low and confined to a noise abatement of the order of no more than approximately 5 decibels (A). However, even this modest result is achieved only on condition that an air-resonance-absorbing interior lining is fitted in the encapsulation.

Other conventional constructions of a similar type are slightly more effective in acoustic respects because sound-suppressors are provided at the cooling-air intake and outlet ports, but in view of the large volume of cooling air required by the radiator, these take up a great deal of additional space and create considerable additional dynamic resistance to the flow of cooling air.

There have also been quite a number of steps and provisions of a different kind for reducing the noise of motor vehicle engines. For example, German Pat. No. 1,127,733 describes a sound resonance and vibration insulation for a motor car engine which is achieved by filling the entire engine space or compartment between the engine bonnet and the engine parts which constitute sound and vibration emission sources with foamed or expanded plastics material. However, in this arrangement the high heat retention of thermal insulation of the foamed plastic material constitutes a serious disadvantage because it markedly impairs the exchange of heat between the engine and its surroundings.

It is also familiar practice to insulate the interior of a motor vehicle relative to the engine area by means of a sound and/or heat insulating partition wall or bulkhead. As a rule this is done with the aid of multi-layered panels such as laminates with appropriate insulation layers, as described, for example in French Pat. No. 795,337 and U.S. Pat. No. 1,845,444. Obviously these provisions have no influence whatsoever with regard to noise emanation from the engine or engine-gearbox unit to the outside.

From French Pat. Nos. 934,538 and 934,539 it is further known to reduce the noise level in the passenger compartment of a motor vehicle by means of a separate bodyresonance insulating mounting of the engine-gearbox unit and an elastic suspension of the car body from the chassis of the vehicle. However, these arrangements do not include any sound-suppressing provisions for the engine as such.

Finally, German Pat. No. 1,180,155 discloses an arrangement wherein the engine area or compartment of a motor vehicle is lined with sound-absorbing panels which are provided with a profiled sealing strip of soft PVC embracing the panel edges. The purposes of this arrangement is to achieve an elastic relative mobility for the individual walls and to avoid the transmission of vibrations from one wall to an adjacent wall.

It is the aim of the present invention to obviate the disadvantages appertaining to the above-mentioned conventional arrangements and to provide a motor vehicle of the kind specified, comprising a noise-suppressingly encapsulated engine or engine-gearbox unit supported via elastic intermediate elements from the two longitudinal subframe beams of the vehicle and a fan-cooled water radiator, which ensures a high degree of acoustic efficiency for the sound suppressing encapsulation. In addition there is a noticeable weight reduction, as well as lowering of costs and an achievement of substantially simplified assembly conditions in case of service and repair work as compared with conventional arrangements.

SUMMARY OF THE INVENTION

According to this invention, we provide a motor vehicle of the kind defined, characterized in that the noise suppressing encapsulation is integrated with two subframe beams and comprises adjoining side walls, end walls and cover plates which may also be standard car body components to form an all around fully enclosed soundproof encapsulation, and in that the cooling air which flows through the radiator is conducted to the atmosphere externally of the encapsulation.

In the application of the invention to certain motor vehicles, the two wheel arches of the vehicle form side walls of the encapsulation.

In the encapsulation, the adjacent lateral walls, bulkheads, frontal walls and cover plates may partly belong to the vehicle body in order to establish an all around fully enclosed soundproof encapsulation area.

This embodiment has a number of important advantages as compared with conventional arrangements. For example, not only does it make for substantially simplified assembly and fitting conditions which greatly facilitate the care and maintenance of the engine, but also, in comparison with those conventional constructions wherein the total amount of the cooling air heated by and flowing away from the radiator flows through the sound-absorbing casing, it provides a substantially higher acoustic efficiency for the same amount of space occupied or, alternatively, for the same acoustic effect it requires very much less space in view of the omission of large sized sound suppressors for the cooling air. By reducing the volume of air which flows through the casing to the absolute minimum needed to prevent heat accumulation, it is also possible to reduce the amount of dirt entering into the interior of the casing so that cleaning operations only have to be carried out at very infrequent intervals.

All these advantages are achieved by very simple means, since essential components of the car body and chassis, or subframe, which are already provided on the vehicle, are included in the formation of the fully enclosed sound-suppressing encapsulation. In this way it is possible to achieve the acoustic effect of full engine encapsulation without having to accept the drawbacks of such with regard to fitting and maintenance work.

A further advantage of the construction according to this invention resides in that it also allows standard mass-produced motor vehicles to be subsequently equipped with the additional cladding parts required to achieve full encapsulation.

According to yet another feature of this invention the various pipes, wires, shafts, actuating members and the like which pass through the sound-suppressing encapsulation in the usual way can be advantageously conducted through wall regions of the encapsulation which are situated remote from the maintenance points of the engine or engine-gearbox unit, and these wall portions may be secured to the vehicle subframe and/or the body, e.g., by means of screws. This ensures ready access to the points of engine and/or gearbox which require regular service without expensive dismantling work or stripping down.

In accordance with this invention it is a further advantage that the noise-suppressing encapsulation comprises, in per se conventional manner, readily detachable or hinged cover elements in the region of service points for the engine or engine-gearbox unit. This further facilitates and simplifies maintenance and repair work.

In a particularly simple embodiment of the invention, the noise suppressing encapsulation is closed on the top side thereof by the floor of the drivers cabin or the engine hood or bonnet of the vehicle. In consequence of such comparatively large areas or wall surfaces of the vehicle being employed as upper end walls for the noise suppressing encapsulation, it is possible to obviate a double-walled construction in these regions and to reduce extra weight to a minimum. Naturally, this also means a corresponding reduction in costs of material.

According to a further development of this invention it is particularly advantageous for the interior space of the noise suppressing encapsulation to be forced-draft ventilated in per se conventional manner by its own fan unit with sound absorbers or silencers provided at the cooling air intake and exhaust ports of the encapsulation. Since only comparatively small amounts of air are required for adequate ventilation of the encapsulated interior, the cross sections of cooling air intake and exhaust ports can be much smaller than was the case in those conventional constructions wherein the whole air flow from the radiator is conducted through the encapsulated area. Consequently the silencers or sound absorber devices can also be made much smaller and still satisfactorily absorb the noise which would otherwise emanate unobstructedly from these openings or ports.

In the case of the last-mentioned form of execution wherein the encapsulation is fan ventilated it is particularly advantageous, according to a further feature of this invention, that the cooling air intake port of the noise suppressing encapsulation be arranged away, or remote, from the outflow paths of the fan air which has been heated by passing through the radiator. For example, a separate air intake slit may be provided for this purpose beneath the radiator grill of the vehicle. This ensures that the air which is aspired by the additional fan unit of the noise suppressing encapsulation will be at ambient temperature so that comparatively small amounts of cooling air suffice to dissipate excess heat from the interior of the encapsulation.

According to this invention it is further advisable to split the cooling air which enters into the interior of the noise suppressing encapsulation into two streams whereof one stream flows around the exterior parts of the exhaust system and the other stream passes over the remaining engine surfaces or walls, these streams being relatively separately conducted towards separate exhaust ports of the encapsulation. This cooling-air system presents the advantage of a well defined cooling for the driving unit which gives due consideration to the relatively different cooling requirements of the exhaust system and the less hot surfaces.

According to a further form of execution of this invention the outlet or exhaust port of one of the cooling air branch currents may take the per se conventional form of an absorption silencer arranged around the exhaust pipe to form an annular gap with the latter. This arrangement for the cooling air exhaust port is particularly advantageous because it gives special consideration to acoustic as well as thermal conditions. In this way undue heat conduction from the exhaust pipe into the encapsulation in the region of the passage opening is safety prevented with the aid of extremely simple means. For adequately reducing noise with regard to those parts of the exhaust system which are situated externally of the encapsulation, it is possible to fit resonance-absorbing intermediate elements or packing pieces in the exhaust pipe within the encapsulation or in the cooling-air outlet tunnel.

For further understanding of the ventilation and sound absorption silencer, reference may be made to U.K. Patent specification No. 1,325,773.

DESCPITION OF THE DRAWING

The invention will be hereinafter more specifically explained with reference to two exemplary embodiments depicted in the accompanying drawings wherein:
  is a partial frontal view of a motor vehicle according to this invention along the section line I-I in FIG. 2 with the frontal end wall of the noise suppressing encapsulation removed;
  FIG. 2 is a part-sectional side view of the motor vehicle shown in FIG. 1;
  FIG. 3 is a part-sectional side view of a frontwheel drive lorry with tiltable driver's cabin equipped in accordance with the present invention; and
  FIG. 4 is a frontal view of the lorry shown in FIG. 3 omitting the radiator-fan unit and the frontal end wall of the noise suppressing encapsulation.

DESCRIPTION OF THE PREFERRED EMBODIMENTS

Figure 1:
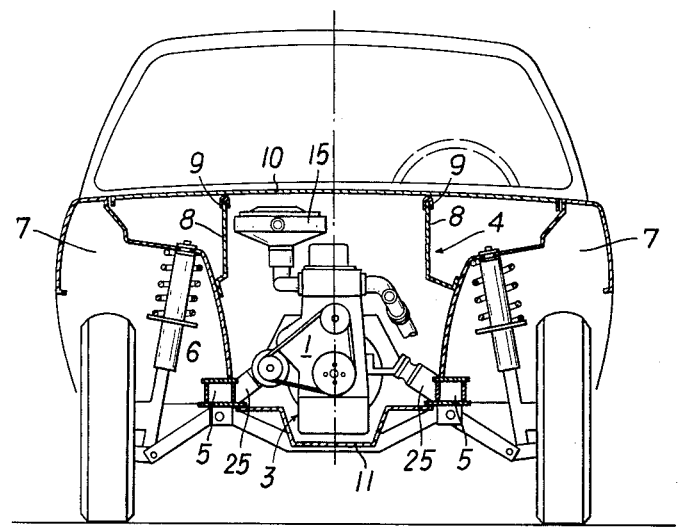

With reference to the embodiments depicted in the drawings, an engine 1 and a gearbox 2 comprise an engine-gearbox unit 3 which is enclosed all around by a noise suppressing encapsulation 4. In both embodiments standard components of the vehicles are used or included to form the encapsulation 4.

Figure 2:
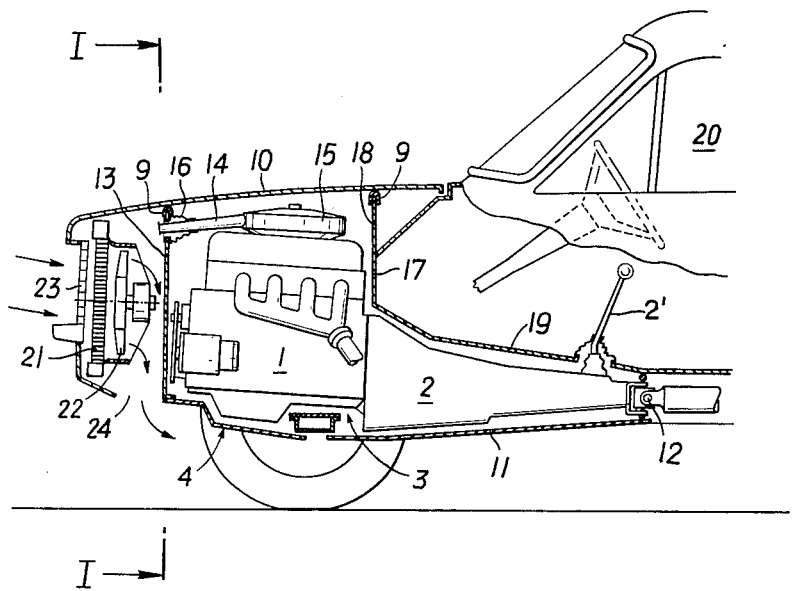

In the case of the motor vehicle shown in FIGS. 1 and 2, two longitudinal subframe beams 5 of the vehicle as well as interior walls 6 of two wheel arches or wheel boxes 7 participate in the formation of the noise suppressing encapsulation 4. The lower portions of substantially upright lateral encapsulation walls 8 are secured in a sound-proof manner to the wheel arch walls 6. These lateral walls 8 have their top edges fitted with sound-suppressing sealing beads 9 and the closed bonnet or engine hood 10 of the car rests flush on these beads 9 to provide the top end wall of the noise suppressing encapsulation 4.

The bottom end wall of the noise suppressing encapsulation 4 is provided in the form of a cover plate 11 connected in sound proof manner to the frame beams 5 and extending beneath the gearbox 2 right up to a forward cardan or universal joint 12. At the front, the encapsulation 4 is closed by a frontal end wall 13 secured to the frame beams 5 and the wheel arch walls 6 and including an aperture in the region of an intake pipe 14 for an air filter 15 of the engine, the intake pipe 14 being conducted through the aperture in sound-proofed manner with the aid of an elastic boot 16.

The rear of the engine compartment is closed by a rear-encapsulation end wall 18 secured in upright position to the bulkhead 17, the latter co-acting with the frontal part of the floor 19 of the car to provide complementary components for the noise suppressing encapsulation 4 relative to the passenger compartment 20. The passages or openings for the cardan shaft in the region of the forward cardan joint 12, and all other passages or openings for pipes, wires, tubes or actuating elements not visible in the drawing are also sound proofed. In the case of the motor vehicle shown in FIGS. 1 and 2, the radiator 21 together with a separately driven cooling air fan 22 represent a constructional unit which is separate and spaced away from the driving unit 3 and arranged forwardly of the frontal end wall 13 immediately behind the radiator grill 23. The cooling air which flows through the radiator 21 and is so heated is conducted through an exhaust air tunnel 24 leading it downwardly in front of the end wall 13 and out to free atmosphere as shown by the arrows. Alternatively, the exhaust air can be discharged into the two wheel arches 7 of the car.

Standard elastic bearing elements 25 support the engine 1 on the two subframe beams 5. Since these elements 25 are situated within the noise suppressing encapsulation 4 it is no longer necessary to provide resonance absorbing intermediate elements between the engine and its encapsulation as was the case in earlier constructions wherein the noise suppressing casing was mounted on the engine itself. A further advantage as compared with the conventional construction resides in the easy accessibility of the service and maintenance points of the engine without major stripping operations. This applies especially with regard to the main parts of the engine 1 and its auxiliary units which require constant maintenance and are fully accessible when the bonnet 10 is opened.

Figure 3:
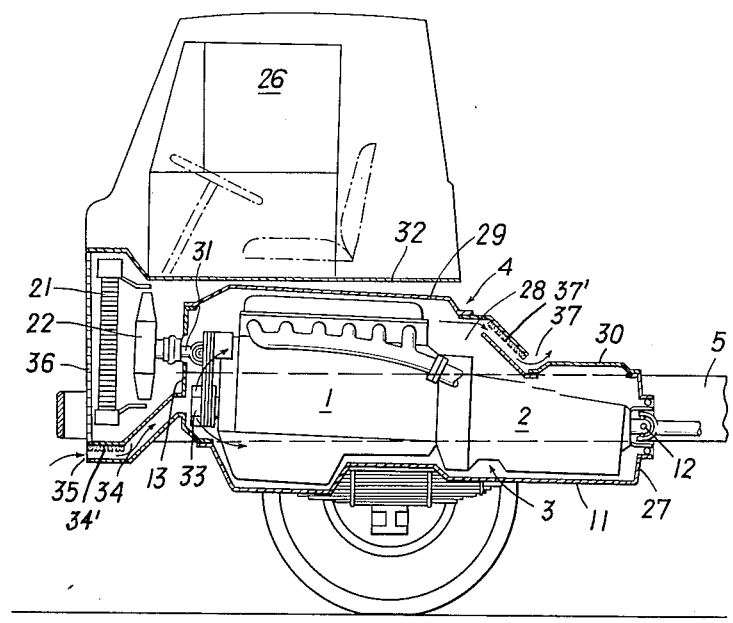
Figure 4:
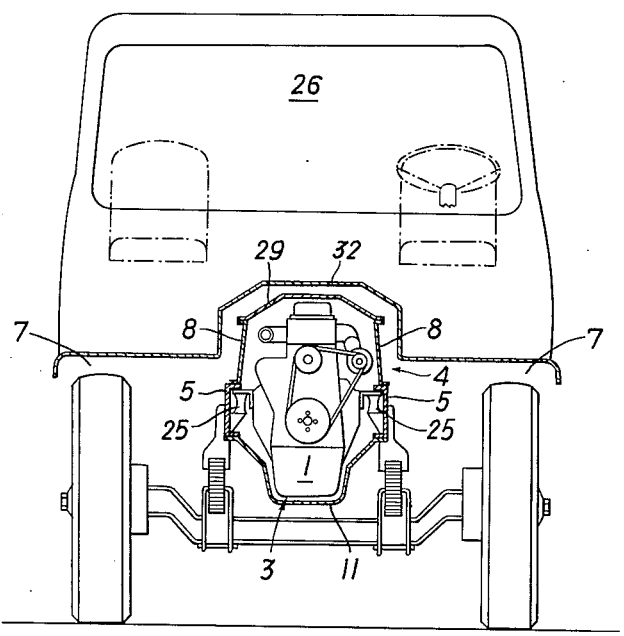

In the embodiment of the invention illustrated in FIGS. 3 and 4, wherein like references have been used for like parts as in FIGS. 1 and 2, the invention has been applied to a lorry in which the driver's cabin 26 is of a conventional tilting or tipping type. In this vehicle the two longitudinal frame members 5 are of C-section and are integral components of the noise-suppressing encapsulation 4 for the driving unit 3 comprising the engine 1 and the gearbox 2. Two lateral encapsulation walls 8 are secured in a sound-proof manner to the upper flanges of the members 5 and a bottom cover plate 11 is secured to the lower flanges of the members 5. In addition to a frontal end wall 13 there is a rear encapsulation wall 27 in the region of the forward cardan joint 12, which is integral with the cover plate 11. The interior 28 of the encapsulation is closed at the top by a cover plate 29 secured in sound-proof manner to the upper edge of the lateral walls 8 and the end walls 13 and 27. Above the gearbox 2 the cover plate 29 includes an opening which is closed by a detachable flap or cover member 30 which can be readily removed to afford easy access for maintenance and repair work.

In the lorry shown in FIGS. 3 and 4, the fan 22 and associated radiator 21 are situated externally of the noise suppressing encapsulation 4, forwardly of the frontal end wall 13. The fan 22 is driven by means of a fan shaft 31 driven from the engine 1 and conducted in sound-proof manner through the end wall 13. The cooling air which is heated by the radiator 21 partly flows, as in the embodiment of FIGS. 1 and 2, downwardly in front of the end wall 13 and direct to the exterior, whilst the remainder of the air escapes partly into the space 7 around the two wheels and partly into the space between a cabin floor 32 and the encapsulation 4.

Excess engine heat from the interior 28 of the noise suppressing encapsulation 4 is removed by a forced draft ventilation system involving an additional fan 33 arranged in conventional position within the encapsulation 4 and driven by the engine 1. This additional fan 33 aspires cooling air through its own air intake channel 34 which is lined with a noise-absorbing material in the form of a silencer 34' that has its intake port 35 arranged remote from the air outflow paths of the fan 22 beneath a frontal fan grille 36 of the vehicle. This arrangement ensures that the additional fan 33 receives only fresh air at exterior atmospheric temperature. The cooling air which is heated in the interior 28 is divided into two streams, one of which flows around the engine surfaces and is conducted outside to free atmosphere through an exhaust port 37 fitted with a sound absorption silencer 37'. The exhaust port 37 is provided in the cover 29 behind the driver's cabin 26. The other stream may flow over and pass the engine exhaust system and be conducted to another exhaust port which is arranged around the engine exhaust pipes and is concentric thereto with a sound absorption silencer incorporated in the arrangement.

It will be appreciated that numerous further forms of vehicle execution are conceivable within the scope an framework of this invention which may differ markedly from the constructions hereinbefore described and illustrated but which realize the basic principle of including existing vehicle components to form integral parts of the noise suppressing encapsulation. The invention may also be applied to driving units which are mounted transversely of the longitudinal direction of the vehicle, and with equal advantage to rear-engine vehicles.

We claim:

1. A motor vehicle comprising a water cooled internal combustion engine and a gearbox, said gearbox being connected to the engine to form an engine-gearbox unit, a fan-cooled water radiator, a chassis frame with two subframe beams, said engine-gearbox unit being supported on the two subframe beams via elastic bearing elements, a vehicle body connected to said chassis frame and having an engine compartment and a passenger compartment, two wheel arches forming lateral walls of the engine compartment and being connected to said subframe beams, an engine hood forming an upper wall of the engine compartment, a partition separating the engine compartment from the passenger compartment and forming a rear end wall of the engine compartment, a frontal end wall extending transversal relative to the longitudinal axis of the vehicle between the said two wheel arches, two upright lateral walls, each of them extending from one of the wheel arches upwards to the engine hood, said rear and frontal end walls being connected to said lateral walls, a bottom cover plate forming a bottom end wall of the engine compartment, said cover plate being connected to the subframe beams and the frontal end wall, said wheel arches, upright lateral walls, frontal and rear endwalls, and the bottom end wall forming together with the two subframe beams and the engine hood an all around fully closed soundproof encapsulation, the engine-gearbox unit being arranged within said encapsulation, said water radiator and its fan being located outside and in front of the said soundproof encapsulation.

2. A motor vehicle as claimed in claim 1, further comprising pipes, shafts, and actuating elements extending from the engine-gearbox unit, the engine-gearbox unit having maintenance points, encapsulation wall portions being spaced apart from said maintenance points and being at least in part detachably connected to the vehicle, said pipes, shafts, and actuating elements penetrating said encapsulation wall portions spaced apart from the maintenance points of the engine-gearbox unit.

3. A motor vehicle as claimed in claim 2 further comprising at least one cover detachably mountd to the soundproof encapsulation in the region of one of the maintenance points of the engine-gearbox unit.

4. A motor vehicle comprising a water cooled internal combustion engine and a gearbox, said gearbox being connected to the engine to form an engine gearbox unit, a fan-cooled water radiator, a chassis frame with two subframe beams, said engine-gearbox unit being supported on the two subframe beams via elastic bearing elements, a drivers cabin mounted to the vehicle frame and located above the engine-gearbox unit, the cabin floor forming a bottom end wall of the drivers cabin, and an engine compartment arranged below the drivers cabin, said engine compartment comprising two upright lateral walls, each of them extending upwards from one of the subframe beams, a frontal endwall and a rear endwall, both extending transversal relative to the longitudinal axis of the vehicle between the two subframe beams and being connected to the lateral walls, an upper cover resting on an upper rim of the said upright lateral walls and the frontal and rear endwalls, a bottom cover being secured to a lower rim of the two subframe beams and the frontal and rear endwalls of the engine compartment, said upright lateral walls, frontal and rear endwalls forming together with the two subframe beams and the two covers an all around fully closed soundproof encapsulation, the engine-gearbox unit being arranged within said encapsulation, said water radiator and its fan being located outside and in front of the said soundproof encapsulation.

5. A motor vehicle as claimed in claim 4, comprising at least one cover detachably mounted to the soundproof encapsulation in the region of one of the said maintenance points of the engine-gearbox unit.

6. A motor vehicle as claimed in claim 4, further comprising a cooling air intake opening and at least one cooling air outlet opening provided on said soundproof encapsulation, a first silencer located in the region of the cooling air intake opening, s second absorption silencer provided in the area of the cooling air outlet opening, and an additional air fan located within the soundproof encapsulation between the cooling air intake opening and the cooling air outlet opening.

7. A motor vehicle as claimed in claim 6, further comprising at least one exhaust air shaft fed by the air heated in the said water radiator, said cooling air intake opening of the soundproof encapsulation being situated remote from the said exhaust air shaft.

* * * * *